United States Patent
Panades

(10) Patent No.: US 7,477,553 B2
(45) Date of Patent: Jan. 13, 2009

(54) CONTROL DEVICE FOR CONTROLLING A BUFFER MEMORY

(75) Inventor: Ivan Miro Panades, Grenoble (FR)

(73) Assignee: STMicroelectronics SA, Montrouge (FR)

( * ) Notice: Subject to any disclaimer, the term of this patent is extended or adjusted under 35 U.S.C. 154(b) by 53 days.

(21) Appl. No.: 11/735,429

(22) Filed: Apr. 13, 2007

(65) Prior Publication Data

US 2007/0283056 A1 Dec. 6, 2007

(30) Foreign Application Priority Data

Apr. 13, 2006 (FR) .................................. 06 03247

(51) Int. Cl.
*G11C 7/00* (2006.01)
(52) U.S. Cl. .................... 365/189.12; 365/221; 365/191
(58) Field of Classification Search ............ 365/189.12, 365/221, 191, 239, 49, 189.05, 189.04, 189.03, 365/189.07, 230.05, 233

See application file for complete search history.

(56) References Cited

U.S. PATENT DOCUMENTS

| 5,473,756 | A | 12/1995 | Traylor |
| 6,041,370 | A | 3/2000 | Guyt |
| 6,389,490 | B1 | 5/2002 | Camilleri et al. |
| 6,963,220 | B2 * | 11/2005 | Momtaz et al. ............... 326/37 |
| 2005/0122794 | A1 | 6/2005 | Chard et al. |
| 2007/0139085 | A1* | 6/2007 | Elliot et al. .................. 327/100 |

* cited by examiner

*Primary Examiner*—Dang T Nguyen
(74) *Attorney, Agent, or Firm*—Lisa K. Jorgenson; Stephen Bongini; Fleit Gibbons Gutman Bongini & Bianco P.L.

(57) ABSTRACT

A control device is provided for controlling a buffer memory that can store n data words and is capable of being used for data transfer between a first system and a second system. The control device includes a write pointer and a read pointer. The control device also includes a write management circuit and a read management circuit. The write management circuit compares the content of the write pointer and the content of the read pointer, and authorizes or does not authorize a write operation in the memory. The read management circuit compares the content of the write pointer and the content of the read pointer, and authorizes or does not authorize a read operation in the memory.

20 Claims, 2 Drawing Sheets

CONTROL DEVICE FOR CONTROLLING A BUFFER MEMORY

CROSS-REFERENCE TO RELATED APPLICATIONS

This application is based upon and claims priority from French Patent Application No. 06 03247, filed Apr. 13, 2006, the entire disclosure of which is herein incorporated by reference.

BACKGROUND OF THE INVENTION

1. Field of the Invention

The present invention relates to a control device for controlling a buffer memory that can store n data words and is capable of being used for data transfer between a first system and a second system, with the control device including a write pointer and a read pointer.

2. Description of Related Art

The present invention is especially valuable in the case of two electronic systems exchanging data asynchronously or mesochronously. The data exchanged between two systems is said to be "asynchronous" if the two systems operate with clocks of different frequencies. A data exchange is said to be "mesochronous" if the two systems operate with clocks that have the same frequency but are phase-shifted relative to each other.

Many electronic circuits, integrated or otherwise, have independent systems that operate at the rhythm of clock signals that have different frequencies and/or that are phase-shifted relative to each other. This is the case, for example, when a processor handles the data at a high frequency and then transmits it to downstream circuits operating at a lower frequency. This is also the case when two systems have their paces set by the same clock signal generator, but with the first system being at a greater distance from the clock signal generator (in terms of length of the wire conveying the clock signal) than the second system, so that the clock signal received by the first system is phase-shifted relative to the clock signal received by the second system.

The transfer of data between two systems can be done, for example, using a buffer memory.

FIG. 1 shows a circular buffer memory comprising one write-accessible port and one read-accessible port. The memory has n storage registers R1 to Rn, one input selection circuit, one output selection circuit, and one control device. The n storage registers store data words in transit between the first system and the second system. The input selection circuit comprises a data input connected to a data output of the first system for receiving data to be transmitted, and n outputs each connected to one input of one of the n storage registers R1 to Rn. The input selection circuit also has a control input to receive a signal indicating the output to which the data input is to be connected. The output selection circuit comprises n data inputs each connected to one data output of the n registers R1 to Rn, one data output connected to one data input of the second system, and one control input. When the first system commands a write operation (WRITE signal) and/or when the second system commands a read operation (READ signal), the control device produces control signals WRITE_SELECT and/or READ_SELECT for writing a piece of data to a register and/or reading a piece of data from a register, so that the pieces of data are read from the memory in the order in which they were written.

The control device comprises a write pointer and a read pointer. In practice, these pointers are shift registers whose contents indicate the storage registers, from among the storage registers R1 to Rn, in which a next word is to be written and a next word is to be read, respectively. The contents of the write pointer and the read pointer, respectively, are updated at each write operation and each read operation, respectively, in a register of the memory.

When the first system and the second system which use the buffer memory communicate asynchronously or mesochronously, phenomena of instability (commonly called "metastability") may appear; the second system receives a piece of data different from that transmitted by the first system when a data signal or command signal inside the memory or associated control device changes its state upon a command from the first system and does not have the time necessary to stabilize its value before being exploited by the second system.

To prevent instability in the case of a transfer of data through a unique storage register whose rate is set by the clock of the first system (i.e., the system which stores data in the storage register), one elementary technique is the addition, at output of the storage register, of a synchronization circuit. This synchronization circuit is, for example, a two-bit shift register whose rate is set according to the clock of the second system (i.e., the system that receives the data contained in the storage register).

This technique introduces a latency of one to two clock cycles. Latency is the time between the instant when a signal changes its state and the instant when its value is stable and guaranteed. In the case of the addition of a synchronization circuit, the latency of the control device is equal to the transit time in the synchronization circuit.

Other techniques are also used to prevent instabilities in buffer memories (such as FIFO memories), banks of registers, or dual-port memories which are more complex than a simple register.

A first technique described in French Patent No. 2 849 228 or U.S. Patent Application No. 2004/0230723 uses a dual-flag mechanism (or "acknowledgment-due mechanism") to ensure accurate reception of the data by the second system, and ghost registers (images of a pointer) to acquire a modification of the content of a pointer before it is exploited. Although the problem of the metastability of the data is well resolved, one drawback of this technique is high latency, of about 2 to 6 clock cycles. This is the time needed for the acknowledgment of reception sent by the second system to be received by the first system after the updating and exploitation of the content of the ghost registers.

A second technique described in U.S. Pat. No. 5,598,113 uses a control device comprising, as a complement, read and write pointers, one n-bit state register (register 1150) updated according to the content of the write pointer and the read pointer (see, e.g., FIGS. 11 and 12 and their associated description). Each bit of the state register indicates whether the same-ranking register of the buffer memory contains a data word (that can be read by the second system) or if the register is empty (so that it can be written to by the first system).

The control device also has a write management circuit in which the signals output from the state register (register 1150) are used to determine whether the memory is full (circuit 1050 of D3) and the result (signal 1151) is synchronized (circuit 1135) before it is used (signal 1115) to update the write pointer (1130). Also, the control device comprises a read management circuit in which the signals output from the state register are synchronized (circuit 1160 of D3) with the clock signal of the second system before being used to determine whether the memory is empty (circuit 1165), with the result (the signal 1175) being then used for the updating of the read pointer (1170).

One drawback of this technique is that it necessitates the use of a state register to manage the content of the memory. This increases the silicon surface area of the control device. Furthermore, this state register is obtained by jam-type latch circuits. Such latch circuits are more robust than D-type latch circuits or flip-flop circuits with respect to the metastability phenomena that appear in systems communicating mesochronously.

SUMMARY OF THE INVENTION

It is an object of the present invention to overcome these drawbacks and to provide a device for controlling a buffer memory that can store n data words and is capable of being used for data transfer between a first system and a second system, with the control device comprising a write pointer and a read pointer.

One embodiment of the present invention provides a control device for controlling a buffer memory that can store n data words and is capable of being used for data transfer between a first system and a second system. The control device includes a write pointer comprising a first n bit shift register, a read pointer comprising a second n bit shift register, a write management circuit, and a read management circuit. The first n bit shift register has a data input and a data output that are connected together, a control input, and a clock input. The write-enable signal, which is active when the memory is not full and the first system commands a write operation, is supplied to the control input of the first n bit shift register, and a first clock signal associated with the first system is supplied to the clock input of the first n bit shift register. The second n bit shift register has a data input and a data output that are connected together, a control input, and a clock input. The read-enable signal, which is active when the memory is not empty and the second system commands a read operation, is supplied to the control input of the second n bit shift register, and a second clock signal associated with the second system is supplied to the clock input of the second n bit shift register. The first n bit shift register contains at least two successive bits in a first logic state with the other bits being in a second logic state, and the second n bit shift register contains at least two successive bits in the first logic state with the other bits being in the second logic state. The write management circuit compares the content of the write pointer and the content of the read pointer, and authorizes or does not authorize a write operation in the memory. The read management circuit compares the content of the write pointer and the content of the read pointer, and authorizes or does not authorize a read operation in the memory.

Another embodiment of the present invention provides an electronic circuit that includes such a control device. The electronic circuit also includes a first system, a second system, and a buffer memory that is used for data transfer between the first system and the second system. The control device controls the buffer memory.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Figure 1:
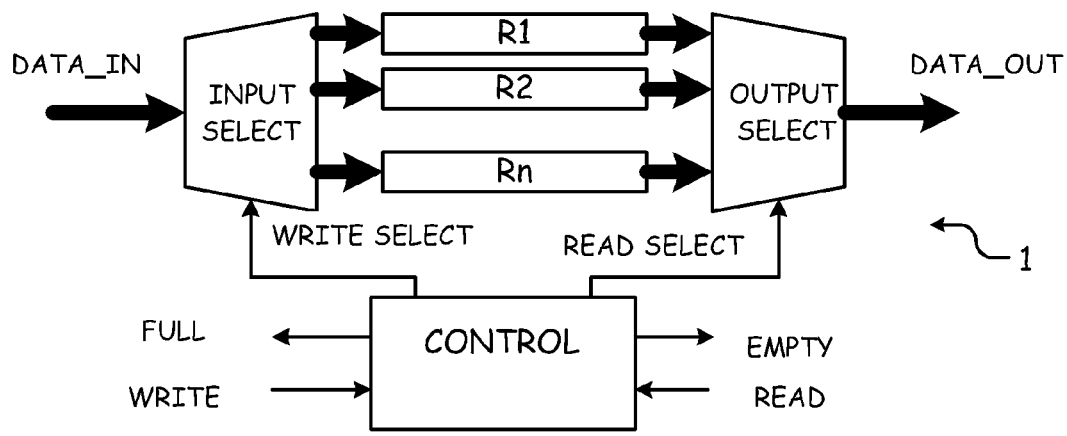
FIG. 1 is a drawing of a conventional buffer memory.

Preferred embodiments of the present invention will be described in detail hereinbelow with reference to the attached drawings.

One preferred embodiment of the present invention provides a control device that includes a write management circuit and a read management circuit. The write management circuit compares the content of the write pointer and the content of the read pointer, and authorizes or does not authorize a write operation in the memory. The read management circuit compares the content of the write pointer and the content of the read pointer, and authorizes or does not authorize a read operation in the memory.

This control device does not use any state register. The write management circuit and the read management circuit work directly on signals coming from the write pointer and the read pointer. This limits the size of the device.

The write pointer of this embodiment is a first n-bit shift register that includes a data input and a data output that are connected together, a control input, and a clock input. A write-enable signal, which is active when the memory is not full and the first system commands a write operation, is supplied to the control input, and a first clock signal associated with the first system is supplied to the clock input. The first register contains at least two successive bits in a first logic state, with the other bits being in a second logic state.

The read pointer of this embodiment is a second n-bit shift register that includes a data input and a data output that are connected together, a control input, and a clock input. A read-enable signal, which is active when the memory is not empty and the second system commands a read operation, is supplied to the control input, and a second clock signal associated with the second system is supplied to the clock input. The second register contains at least two successive bits in the first logic state, with the other bits being in the second logic state.

Thus, in the write pointer, the position of the register in which the next bit to be written is encoded by at least two successive bits (and not only one bit as in the convention circuit) having a first logic value, with the other bits of the write pointer having a second logic value that is different from the first one. With this new encoding, during the updating of the write pointer at the time of a write operation, at least one of the two bits having a first value is unchanged as shall be seen below in the exemplary embodiments. Thus, as compared with the conventional devices, the risk of metastability is limited, especially if the two systems using the control device exchange data asynchronously. The same encoding is used in the read pointer in the preferred embodiment.

In some embodiments, a first synchronization circuit is used in the write management circuit just as in the conventional circuit, and in the read management circuit a second synchronization circuit is used just as in the conventional circuit.

In an alternative embodiment, the second synchronization circuit comprises an adjustable delay circuit for delaying the second clock signal, and n D-type latch circuits or flip-flop circuits. Each of the n D-type latch circuits or flip-flop circuits comprises one data input connected to a data output of a same-ranking latch circuit of the write pointer, one clock input to which the second delayed clock signal is supplied, and one output. The outputs of the n D-type latch circuits or flip-flop circuits together form one parallel output at which the synchronized signal representing the content of the write pointer is produced.

Preferably, the delay circuit is adjustable. If necessary, and especially when the first clock signal (associated with the first system) and the second clock signal (associated with the second system) have the same frequency but are phase-shifted relative to each other, the delay circuit is adjusted so that the active edges of the delayed clock signal are sufficiently offset from the active edges of the first clock signal and from the active edges of the second clock signal to ensure that the signals are stabilized before being stored. The adjustment of the delay circuit may be done, as the case may be, during the use of the control device or else during the manufacture and testing of the control device. The presence of a delay circuit considerably reduces the phenomena of metastability that may arise.

Exemplary embodiments of the present invention will now be described in detail with reference to FIGS. 2-5.

Figure 2:
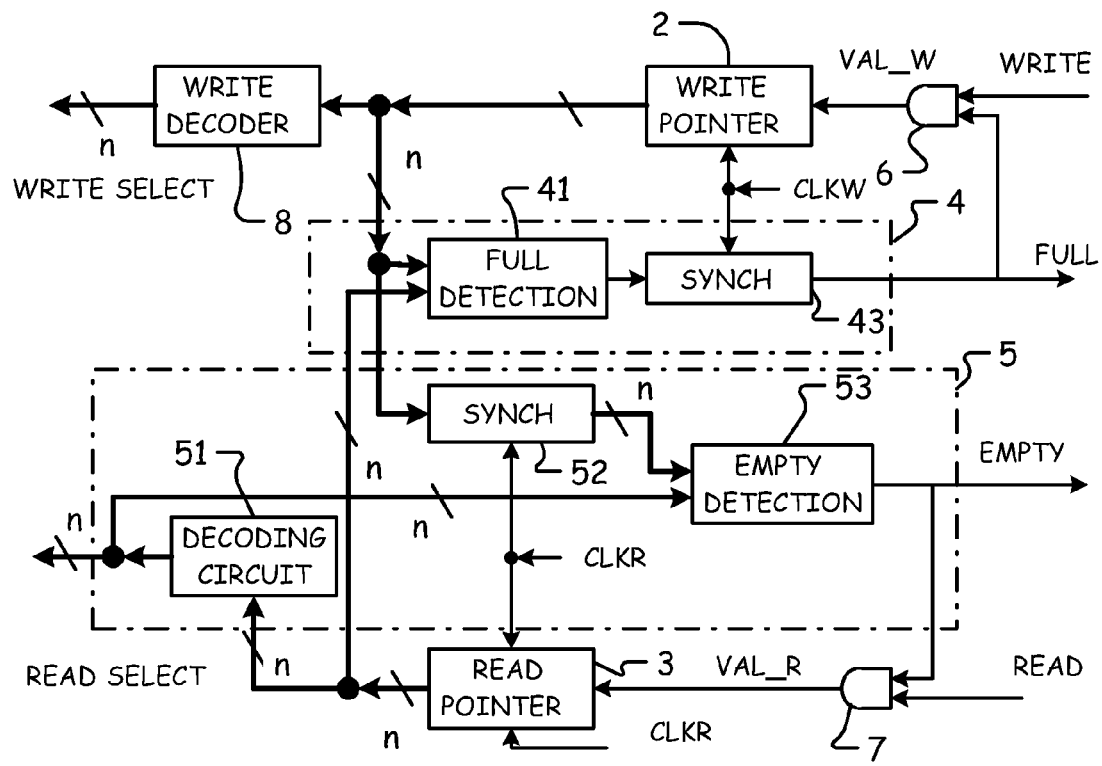
FIG. 2 is a block diagram of a control device for controlling a buffer memory according to one embodiment of the present invention.

FIG. 2 shows a control device for controlling a buffer memory according to one embodiment of the present invention. In this exemplary embodiment, the control device is used to control a buffer memory, such as buffer memory 1 of FIG. 1, that can store n data words and is capable of being used for a transfer of data between a first system and a second system. The two systems can communicate synchronously, asynchronously, or mesochronously.

Like the known control devices, the control device of this exemplary embodiment of the present invention comprises a write pointer 2 and a read pointer 3.

The write pointer 2 is formed by a first n-bit shift register 21 comprising one D-type data input and one Q-type data output that are connected together, one control input EN, and one clock input CK. The shift register 21 has as many bits as there are registers that can be selected in the buffer memory. A write enable-signal ENABLE_W is supplied to the control input EN. This write-enable signal is active when the memory is not full and the first system commands a write operation WRITE. A first clock signal CLKW associated with the first system is supplied to the clock input CK.

The read pointer 3 is formed by a second n-bit shift register 21 comprising one D-type data input and one Q-type data output that are connected together, one control input EN, and one clock input CK. A read-enable signal ENABLE_R is supplied to the control input EN. This read-enable signal is active when the memory is not empty and the second system commands a read operation READ. A second clock signal CLKR associated with the first system is supplied to the clock input CK.

Like all shift registers, the register 21 is a set of series-connected D-type latch circuits (n latch circuits for the register 21); the Q-type data output of the last latch circuit forms a serial data output of the shift register and is connected to the D-type data input of the first latch circuit that forms the data input of the register. The Q-type outputs of each of the latches are connected together to a parallel output of the register, the clock inputs of all the latch circuits are connected together to a clock input CK of the register, and the control inputs of the latches are connected together to the control input EN of the register. The register 31 is formed in the same way as the register 21.

According to this exemplary embodiment of the present invention, the write pointer contains two successive bits in a first logic state (in this example, equal to "1") and n−2 other bits in a second logic state (in this example, equal to "0"). The position of the two successive bits in the first logic state indicates the rank of the register R1 to Rn in which the next piece of data is to be written. In the exemplary embodiment shown in the figures, the first bit at "1" in the write pointer indicates the rank of the register to be written to (in this case R2). The content of the write pointer is shifted at each write operation in the buffer memory (with the signal ENABLE_W active).

For example, if initially the content of the write pointer is equal to:

1 1 0 0 . . . 0 (register to be written to =R1), then, after updating following a write operation, the content of the pointer becomes:

0 1 1 0 . . . 0 (new register to be written to =R2).

The second bit, equal to "1", does not change state at the updating of the pointer. Thus, there is no risk of metastability on this bit when the pointer is updated. The encoding of the information (this information being the rank of the register to be written to) can therefore be advantageously used when both systems that use the control device communicate asynchronously.

Similarly, the read pointer contains two successive bits in a first logic state (in this example, equal to "1") and n−2 other bits in a second logic state (in this example, equal to "0"). The position of the two successive bits in the first logic state indicates the rank of the register R1 to Rn from which the next piece of data is to be read. In particular for the exemplary embodiment shown in the figures, the first bit at "0" after the two bits at "1" in the read pointer indicates the rank of the register to be read from (in this example R5, since the $3^{rd}$ and $4^{th}$ bits of the read pointer are at "1"). The content of the read pointer is shifted at each read operation in the buffer memory (with the signal ENABLE_R active).

As a complement to the write pointer and read pointer, the control device of this embodiment of the present invention also comprises a write management circuit 4, a read management circuit 5, and logic gates 6 and 7. The write management circuit 4 compares the content of the write pointer and the content of the read pointer, and authorizes (with the signal FULL inactive) or does not authorize an operation of writing to the memory. The read management circuit 5 compares the content of the write pointer and the content of the read pointer, and authorizes (with the signal EMPTY inactive) or does not authorize an operation of reading the memory.

The logic gate 6 combines the signal FULL, authorizing or not authorizing a write operation, with a write command instruction WRITE received from the first system, and produces the write-enable signal ENABLE_W that is supplied to the control input of the write pointer. The logic gate 7 combines the signal EMPTY, authorizing or not authorizing a write operation with a read command instruction READ received from the second system, and produces the read-enable signal ENABLE_READ that is supplied to the control input of the write pointers.

The write management circuit 4 comprises a "memory full" detection circuit 41 that makes a bit-by-bit comparison of the content of the write pointer with the content of the read pointer, and produces a signal indicating that the memory is full (FULL signal) if a bit of the read pointer and a same-ranking bit of the write pointer are simultaneously in the first logic state.

Figures 3, 4:
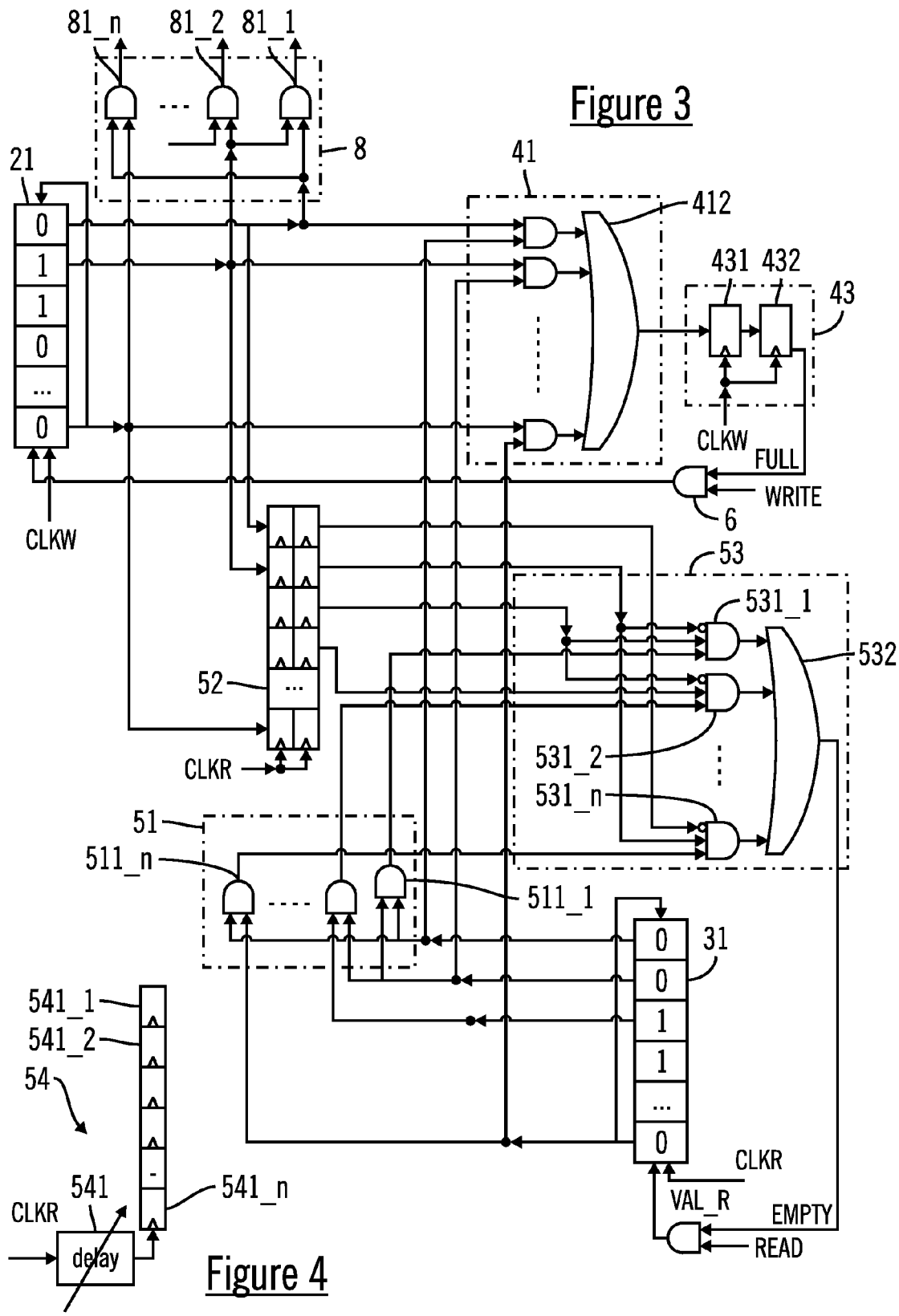
FIG. 3 shows a detailed view of the elements of the device of FIG. 2, and FIGS. 4 and 5 are detailed views of exemplary alternative elements for the device of FIG. 2.

Because it directly uses the contents of the write pointer and the read pointer, the "memory full" detection circuit of this embodiment of the present invention is different from conventional circuits having the same function. As shown in FIG. 3, the "memory full" detection circuit 41 comprises n AND type logic gates 411_1 to 411_n with two inputs and one output, and one n+1-1$^{th}$ logic gate 412. The AND type logic gate 411_i ranked i (with i ranging from 1 to n) comprises a first input connected to a data output of a latch circuit ranked i of the write pointer and one second input connected to a data output of a latch circuit ranked i of the read pointer. The n+1-1$^{th}$ logic gate 412 comprises n inputs each connected to the output of one of the n AND type logic gates, and one output at which the signal FULL is produced.

The write management circuit 4 also has a first synchronization circuit 43 that synchronies the signal FULL, indicating that the memory is full, with the first clock signal CLKW.

The first synchronization circuit 43 has one data input to which the signal FULL is supplied, one clock input to which the signal CLKW is supplied, and one data output at which the synchronized signal is produced.

In the example shown in FIG. 3, the first synchronization circuit 43 is a two-bit register having two series-connected D latch circuits 431 and 432.

Figure 5:
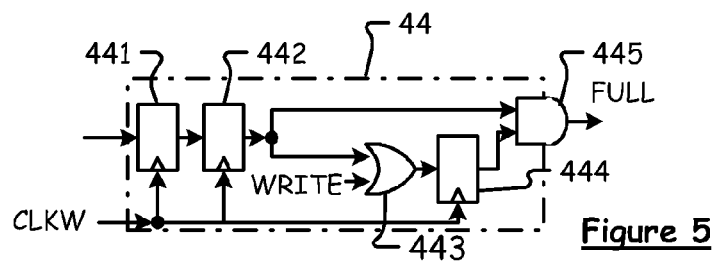

One alternative embodiment of the present invention uses the first synchronization circuit shown in FIG. 5. This first synchronization circuit 44 comprises synchronization means to synchronize the signal produced by the "memory full" detection circuit 41 with the first clock signal CLKW, and delay means to delay the furnishing of the synchronized signal if the write control signal (WRITE) and the synchronized signal had been inactive during a previous active edge of the first clock signal.

Delaying the supply of the synchronized signal optimizes the content of the memory. That is, it provides for the most efficient use of the registers R1 to Rn, taking into account the fact that there is a delay of one to two clock CLKW cycles for the updating of the signal FULL. For this purpose, when the output signal from the synchronization means is active, a check is made to see whether, during the previous clock cycle CLKW, the memory had been full (i.e., whether the output from the synchronization means had been inactive) or whether one write operation had been performed (i.e., if the signal WRITE had been active). In this case, the memory is considered to be really full and the delay means produces the active signal FULL to prohibit an additional write operation.

If, however, during the previous clock signal CLKW, the memory had not been full (with output of the synchronization means inactive) and if a write operation had not been performed (with WRITE inactive at the preceding cycle), then yet another piece of data can be written to the memory and the delay means produces the inactive signal FULL to authorize an additional write operation.

In FIG. 5, the synchronization means includes, as in the case of synchronization circuit 43, a two-bit register having two series-associated D latch circuits 441a and 442. The input of the latch circuit 441 is connected to the output of the detector circuit 41.

The delay means of FIG. 5 includes an OR type gate 443, a D-type latch circuit 444, and an AND type gate 445. The OR type gate 443 comprises one input connected to the output of the latch circuit 442, one input to which the write control signal WRITE is supplied, and one output. The D-type latch circuit 444 comprises one data input connected to the output of the gate 443, one control input to which the first clock signal CLKW is supplied, and one output. The AND type gate 445 comprises one input connected to the output of the latch circuit 442, one input connected to the output of the latch circuit 444, and one output at which the signal FULL is produced.

The gate 443 and the latch circuit 444 store the state of the signal WRITE and the signal output from the two-bit register during the previous clock signal CLKW active edge. The gate 445 combines the state of the signal output from the two-bit register and the information stored by the latch circuit 444.

The read management circuit 5 comprises a decoding circuit 51, a second synchronization circuit 52, and a "memory empty" detection circuit 53. The decoding circuit 51 produces a read selection signal READ_SELECT according to the content of the read pointer, and the second synchronization circuit 52 produces a signal representing the content of the read pointer synchronized with the second clock signal CLKR. The "memory empty" detection circuit 53 compares the synchronized signal representing the content of the write pointer and the read selection signal, and produces a signal EMPTY indicating that the memory is empty (this signal being active or not active according to the result of the comparison).

Depending on the content of the read pointer, the decoding circuit 51 produces an n-bit READ_SELECT signal comprising one bit in the first logic state ("1") and n-1 bits in the second logic state ("0"). The rank of the bit in the first logic state corresponds to the rank of the register R1 to Rn of the memory from which the next piece of data is to be read. The signal READ_SELECT can be supplied directly as a control signal to the input selection circuit of the buffer memory.

The decoding circuit 51 of this exemplary embodiment is formed by n AND type logic gates 511_1 to 511_n with two inputs and one output. The n-ranking logic gate 511_n has a first input connected to the data output of the n-ranking latch of the read pointer 31 and a second input connected to the data output of the first-ranking latch of the read pointer 31. A logic gate 511_i ranked (with i ranging from 1 to n-1) comprises a first input connected to a data output of a latch circuit ranked i of the read pointer 31 and a second input connected to a data output of a latch ranked i+1 of the read pointer 31. The one-bit data outputs of each of the gates 511_1 to 511_n are connected together as the parallel data output of the circuit 51.

In the exemplary embodiment of FIG. 3, the "empty memory" detection circuit 53 comprises n AND type logic gates 531_1 to 531_n and an n+1-i$^{th}$ logic gate. The n AND type logic gates 531_1 to 531_n have two non-inverting data inputs, one inverting data input, and one output. The n+1-i$^{th}$ logic gate 532 comprises n inputs each connected to an output of one of the n logic gates, and one output at which the signal EMPTY indicating that the memory is empty is produced.

The logic gate 531_1 ranked 1 comprises one non-inverting input connected to the wire ranked 1 of the parallel output of the read decoder, one inverting input connected to the wire ranked 2 of the parallel output of the second synchronization circuit 52, one non-inverting input connected to the wire ranked 3 of the parallel output of the second synchronization circuit 52, and one output.

The logic gate 531_2 ranked 2 comprises one non-inverting input connected to the wire ranked 2 of the parallel output of the read decoder, one inverting input connected to the wire ranked 3 of the parallel output of the second synchronization circuit 52, one non-inverting input connected to the wire ranked 4 of the parallel output of the second synchronization circuit 52, and one output.

The logic gate 531_i ranked i (with i ranging from 3 to n−2) has one non-inverting input connected to the i ranking wire of the parallel output of the read decoder, one inverting input connected to the i+1 ranking wire of the parallel output of the second synchronization circuit 52, one non-inverting input connected to the i+1 ranking wire of the parallel output of the second synchronization circuit 52, and one output.

The logic gate 531_n−1 ranked n−1 has one non-inverting input connected to the n−1 ranking wire of the parallel output of the read decoder, one inverting input connected to the n ranking wire of the parallel output of the second synchronization circuit 52, one non-inverting input connected to the wire ranked 1 of the parallel output of the second synchronization circuit 52, and one output.

The logic gate 531_n ranked n has one non-inverting input connected to the n ranking wire of the parallel output of the read decoder, one inverting input connected to the wire ranked 1 of the parallel output of the second synchronization circuit 52, one non-inverting input connected to the wire ranked 2 of the parallel output of the second synchronization circuit 52, and one output.

In the exemplary embodiment of FIG. 3, the second synchronization circuit 52 comprises n two-bit registers 521_1 to 521_n. The n registers 521_1 to 521_n are identical to the first synchronization circuit 43 as described in detail above (i.e., two series-associated latch circuits). Each of them comprises a data input connected to a data output of a same-ranking latch circuit of the write pointer 21, a clock input to which the second clock signal CLKR is supplied, and an output.

The outputs of all the registers 521_1 to 521_n together form a parallel output at which the synchronized signal representing the content of the write pointer is produced.

In the exemplary control device shown in FIG. 3, the second synchronization circuit 52 introduces a latency of ΔCLKA+1 cycles of the clock signal CLKR, corresponding to the time of transit of the content of the write pointer in the second synchronization circuit 52. ΔCLKA is the time between the active edge of the clock signal CLKW and the active edge of the clock signal CLKR at the time of the synchronization. ΔCLKA ranges from 0 to 1 cycle of the signal CLKR. The total latency of the control device of this embodiment of the present invention is then equal to ΔCLKA+2*TR, ranging from 2*TR to 3*TR: an inevitable latency of one cycle, corresponding to the time of updating the registers plus one synchronization latency of one to two cycles.

In an alternative embodiment of the present invention, the second synchronization circuit 52 of FIG. 3 is replaced by the second synchronization circuit 54 of FIG. 4. The second synchronization circuit 54 includes an adjustable delay circuit 541 for delaying the second clock signal CLKR, and n D-type latches 542_1 to 542_n. Each of the D-type latches comprises a data input connected to a data output of a same-ranking latch of the write pointer, a clock input to which the delayed second clock signal CLKR is supplied, and an output. The outputs of the n D-type latches together form a parallel output at which there is produced the synchronized signal representing the content of the write pointer and supplied to the parallel input of the detection circuit 53.

In this alternative embodiment, the second synchronization circuit has only one series of D-type latch circuits (instead of two as in circuit 52). The latency introduced by the synchronization circuit is thus reduced to 0 to 1 cycle and the total latency of the device is reduced to 1 to 2 cycles. Furthermore, the use of the adjustable delay greatly reduces the risk of metastability should the data exchanges between the two systems be done mesochronously.

Other alternative embodiments of the device of FIG. 3 can be envisaged within the framework of the present invention.

A feature of embodiments of the present invention is the encoding of the positions of the registers of the memory to be written to and read from, respectively, in the write pointer and the read pointer, respectively. This encoding makes the device robust with respect to cases of metastability that could appear if the device is used for an asynchronous or mesochronous transfer of data between two systems.

In the exemplary device described in detail with respect to FIG. 3, the following encoding is used:
two bits at "1" and n−2 other bits at "0",
the rank of the first bit at "1" in the write pointer corresponds to the rank of the register to be written to, and
the rank of the first bit at "0" after the two bits at "1" in the read pointer corresponds to the rank of the register to be read from.

More generally, within the framework of the present invention, the position of the register R1 to Rn of the memory to be written to or read from can be encoded in the write pointer and/or in the read pointer so that, at an updating of the write pointer or read pointer (corresponding to a one-bit shift in a shift register), the value of the bit of the pointer associated with the new register to be written to or to be read from does not change during the updating. This averts any risk of metastability on this bit.

This condition is verified as soon as, in a pointer:
at least two successive bits are in a first logic state ("1" or "0"), and the other bits are in a second logic state ("0" or "1"), and
the rank of the register to be written to or to be read from is defined with respect to these at least two bits.

It is thus possible to envisage an alternative encoding such that, in a write pointer or read pointer:
three successive bits are at "0" and n−3 other bits are at "1",
the rank of the first bit at "0" in the write pointer corresponds to the rank of the register to be written to, and
the rank of the first bit at "1" after the three bits at "1" in the read pointer corresponds to the rank of the register to be read from.

Naturally, depending on the encoding chosen, the logic circuits of the control device would be adapted accordingly. This would be the case especially for:
the write management circuit, and more particularly the "memory full" detection circuit (it must verify, from the content of the write pointer and the content of the read pointer, that there remains at least one empty register in the memory to authorize a write operation if necessary), and
the read management circuit, and more particularly the read decoder and the "memory empty" detection circuit (it must verify, from the content of the write pointer and the content of the read pointer, that there remains at least one non-empty register in the memory to authorize a read operation if necessary).

Because the exemplary embodiment of the present invention uses a particular encoding, the control device also has a write decoder 8 for producing, from the content of the write pointer, a write selection signal WRITE_SELECT for controlling the input selection circuit. The n-bit WRITE_SELECT signal has only one active bit, the rank of which corresponds to the rank of the register to be written to in the memory. In the example of FIG. 3, the write decoder has n AND type logic gates 81_1 to 81_n. The logic gate ranked i (with i ranging from 1 to n−1) comprises a data output and two data inputs respectively connected to the output of a latch of the same rank i and to the output of a latch ranked i+1 of the write pointer 21. The logic gate ranked n comprises a data output and two data inputs respectively connected to the output of the latch ranked n and to the output of the latch ranked 1 of the write pointer 21.

The data outputs of all the gates 81_1 to 81-_n are connected together to form a parallel output of the decoder 8 at which the signal WRITE_SELECT is produced.

As for the read selection signal READ_SELECT necessary to control the output selection circuit of the memory, it is produced by the read management circuit 5, and more specifically by the decoding circuit 51 of the read management circuit 5.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A control device for controlling a buffer memory that can store n data words and is capable of being used for data transfer between a first system and a second system, the control device comprising:
    a write pointer comprising a first n-bit shift register, wherein:
        the first n-bit shift register comprises a data input and a data output that are connected together, a control input, and a clock input,
        a write-enable signal, which is active when the memory is not full and the first system commands a write operation, is supplied to the control input of the first n-bit shift register,
        a first clock signal associated with the first system is supplied to the clock input of the first n-bit shift register, and
        the first n-bit shift register contains at least two successive bits in a first logic state, with the other bits being in a second logic state;
    a read pointer comprising a second n-bit shift register, wherein:
        the second n-bit shift register comprises a data input and a data output that are connected together, a control input, and a clock input,
        a read-enable signal, which is active when the memory is not empty and the second system commands a read operation, is supplied to the control input of the second n-bit shift register,
        a second clock signal associated with the second system is supplied to the clock input of the second n-bit shift register, and
        the second n-bit shift register contains at least two successive bits in the first logic state, with the other bits being in the second logic state;
    a write management circuit for comparing content of the write pointer and content of the read pointer, and authorizing or not authorizing a write operation in the memory; and
    a read management circuit for comparing the content of the write pointer and the content of the read pointer, and authorizing or not authorizing a read operation in the memory.

2. The control device according to the claim 1, wherein the write management circuit comprises a "memory full" detection circuit for making a bit-by-bit comparison of the content of the write pointer with the content of the read pointer, and producing a signal indicating that the memory is full if a bit of the read pointer and a same-ranking bit of the write pointer are simultaneously in the first logic state.

3. The control device according to claim 2, wherein the "memory full" detection circuit comprises:
    n AND type logic gates, with the logic gate ranked i, with i ranging from 1 to n, comprising a first input connected to a data output of a latch circuit ranked i of the write pointer, a second input connected to a data output of a latch circuit ranked i of the read pointer, and an output; and
    one $n+1-1^{th}$ logic gate comprising n inputs that each are connected to the output of one of the n AND type logic gates, and an output at which the signal indicating that the memory is full is produced.

4. The control device according to claim 2, wherein the write management circuit further comprises a first synchronization circuit for synchronizing the signal indicating that the memory is full with the first clock signal.

5. The control device according to claim 4, wherein the first synchronization circuit delays furnishing of the synchronized signal if the write control signal and the synchronized signal had been inactive during a previous active edge of the first clock signal.

6. The control device according claim 2, wherein the read management circuit comprises:
    a decoding circuit for producing a read selection signal based on the content of the read pointer;
    a second synchronization circuit for producing a signal representing the content of the read pointer synchronized with the second clock signal; and
    a "memory empty" detection circuit for comparing the synchronized signal representing the content of the write pointer and the read selection signal, and producing a signal indicating that the memory is empty, which is active or not active according to a result of the comparison.

7. The control device according claim 1, wherein the read management circuit comprises:
    a decoding circuit for producing a read selection signal based on the content of the read pointer;
    a second synchronization circuit for producing a signal representing the content of the read pointer synchronized with the second clock signal; and
    a "memory empty" detection circuit for comparing the synchronized signal representing the content of the write pointer and the read selection signal, and producing a signal indicating that the memory is empty, which is active or not active according to a result of the comparison.

8. The control device according to claim 7, wherein the "memory empty" detection circuit comprises:
    n logic gates, with the logic gate ranked i, with i ranging from 3 to n−2, comprising a non-inverting input connected to a wire ranked i of the parallel output of the read decoder, an inverting input connected to a wire ranked i+1 of the parallel output of the second synchronization circuit, a non-inverting input connected to a wire ranked i+2 of the parallel output of the second synchronization circuit 52, and an output; and one n+1-1$^{th}$ logic gate comprising n inputs that each are connected to the output of one of the n logic gates, and an output at which the signal indicating that the memory is empty is produced.

9. The control device according to claim 7, wherein the second synchronization circuit comprises n two-bit registers, each of the n two-bit registers comprising:

a data input connected to a data output of a same-ranking latch circuit of the write pointer;

a clock input to which the second clock signal is supplied; and an output, the outputs of all n two-bit registers together forming a parallel output at which the synchronized signal representing the content of the write pointer is produced.

10. The control device according to claim 7, wherein the second synchronization circuit comprises:

an adjustable delay circuit for delaying the second clock signal; and n D-type latch circuits, wherein each of the D-type latch circuits comprises:

one data input connected to a data output of a same-ranking latch circuit of the write pointer;

one clock input to which the second delayed clock signal is supplied; and one output, the outputs of the n D-type latch circuits together forming one parallel output at which the synchronized signal representing the content of the write pointer is produced.

11. The control device according to claim 1, wherein the first clock signal and the second clock signal have either different frequencies, or have the same frequency but are phase-shifted relative to each other.

12. An electronic circuit comprising:

a first system;

a second system;

a buffer memory that can store n data words, the buffer memory being used for data transfer between the first system and the second system; and a control device for controlling the buffer memory, the control device including:

a write pointer comprising a first n-bit shift register, wherein:

the first n-bit shift register comprises a data input and a data output that are connected together, a control input, and a clock input, a write-enable signal, which is active when the memory is not full and the first system commands a write operation, is supplied to the control input of the first n-bit shift register, a first clock signal associated with the first system is supplied to the clock input of the first n-bit shift register, and the first n-bit shift register contains at least two successive bits in a first logic state, with the other bits being in a second logic state;

a read pointer comprising a second n-bit shift register, wherein:

the second n-bit shift register comprises a data input and a data output that are connected together, a control input, and a clock input, a read-enable signal, which is active when the memory is not empty and the second system commands a read operation, is supplied to the control input of the second n-bit shift register, a second clock signal associated with the second system is supplied to the clock input of the second n-bit shift register, and the second n-bit shift register contains at least two successive bits in the first logic state, with the other bits being in the second logic state;

a write management circuit for comparing content of the write pointer and content of the read pointer, and authorizing or not authorizing a write operation in the memory; and a read management circuit for comparing the content of the write pointer and the content of the read pointer, and authorizing or not authorizing a read operation in the memory.

13. The electronic circuit according to the claim 12, wherein the write management circuit of the control device comprises a "memory full" detection circuit for making a bit-by-bit comparison of the content of the write pointer with the content of the read pointer, and producing a signal indicating that the memory is full if a bit of the read pointer and a same-ranking bit of the write pointer are simultaneously in the first logic state.

14. The electronic circuit according to claim 13, wherein the "memory full" detection circuit of the write management circuit of the control device comprises:

n AND type logic gates, with the logic gate ranked i, with i ranging from 1 to n, comprising a first input connected to a data output of a latch circuit ranked i of the write pointer, a second input connected to a data output of a latch circuit ranked i of the read pointer, and an output; and one n+1-1$^{th}$ logic gate comprising n inputs that each are connected to the output of one of the n AND type logic gates, and an output at which the signal indicating that the memory is full is produced.

15. The electronic circuit according claim 13, wherein the read management circuit of the control device comprises:

a decoding circuit for producing a read selection signal based on the content of the read pointer;

a second synchronization circuit for producing a signal representing the content of the read pointer synchronized with the second clock signal; and a "memory empty" detection circuit for comparing the synchronized signal representing the content of the write pointer and the read selection signal, and producing a signal indicating that the memory is empty, which is active or not active according to a result of the comparison.

16. The electronic circuit according claim 12, wherein the read management circuit of the control device comprises:

a decoding circuit for producing a read selection signal based on the content of the read pointer;

a second synchronization circuit for producing a signal representing the content of the read pointer synchronized with the second clock signal; and a "memory empty" detection circuit for comparing the synchronized signal representing the content of the write pointer and the read selection signal, and producing a signal indicating that the memory is empty, which is active or not active according to a result of the comparison.

17. The electronic circuit according to claim 16, wherein the "memory empty" detection circuit of the read management circuit of the control device comprises:

n logic gates, with the logic gate ranked i, with i ranging from 3 to n−2, comprising a non-inverting input connected to a wire ranked i of the parallel output of the read decoder, an inverting input connected to a wire ranked i+1 of the parallel output of the second synchronization circuit, a non-inverting input connected to a wire ranked i+2 of the parallel output of the second synchronization circuit 52, and an output; and one n+1−i$^{th}$ logic gate comprising n inputs that each are connected to the output of one of the n logic gates, and an output at which the signal indicating that the memory is empty is produced.

18. The electronic circuit according to claim 16, wherein the second synchronization circuit of the read management circuit of the control device comprises n two-bit registers, each of the n two-bit registers comprising:

a data input connected to a data output of a same-ranking latch circuit of the write pointer;

a clock input to which the second clock signal is supplied; and an output, the outputs of all n two-bit registers together forming a parallel output at which the synchronized signal representing the content of the write pointer is produced.

19. The electronic circuit according to claim 16, wherein the second synchronization circuit of the read management circuit of the control device comprises:

an adjustable delay circuit for delaying the second clock signal; and n D-type latch circuits, wherein each of the D-type latch circuits comprises:

one data input connected to a data output of a same-ranking latch circuit of the write pointer;

one clock input to which the second delayed clock signal is supplied; and one output, the outputs of the n D-type latch circuits together forming one parallel output at which the synchronized signal representing the content of the write pointer is produced.

20. The electronic circuit according to claim 12, wherein the first clock signal and the second clock signal have either different frequencies, or have the same frequency but are phase-shifted relative to each other.

* * * * *